(12) United States Patent
Xu

(10) Patent No.: US 12,306,526 B2
(45) Date of Patent: May 20, 2025

(54) LENS DRIVE DEVICE

(71) Applicant: AAC Optics (Nanning) Co., Ltd., Nanning (CN)

(72) Inventor: Tongming Xu, Shenzhen (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 496 days.

(21) Appl. No.: 17/835,946

(22) Filed: Jun. 8, 2022

(65) Prior Publication Data

US 2023/0314902 A1    Oct. 5, 2023

(30) Foreign Application Priority Data

Mar. 10, 2022   (CN) .......................... 202210233335.2

(51) Int. Cl.
*G03B 5/00* (2021.01)
*G03B 17/12* (2021.01)

(52) U.S. Cl.
CPC ............... *G03B 5/00* (2013.01); *G03B 17/12* (2013.01); *G03B 2205/0069* (2013.01)

(58) Field of Classification Search
None
See application file for complete search history.

(56) References Cited

U.S. PATENT DOCUMENTS

2023/0236475 A1* 7/2023 Yan .......................... G03B 5/00
                                                            359/822

* cited by examiner

*Primary Examiner* — Richard H Kim
(74) *Attorney, Agent, or Firm* — Wiersch Law Group

(57) ABSTRACT

The present disclosure discloses a lens drive device, which includes a base; a support frame; a lens holder; a pair of upper elastic sheets insulated from each other, each of the pair of upper elastic sheets includes a first upper arm, a second upper arm, and an upper elastic arm, a conductive support piece, where the conductive support piece includes an elastic piece and a suspension wire, the elastic piece includes a holding portion, a fixing portion, and an elastic portion, the suspension wire connects the fixing portion to the base; a drive coil; a drive magnetic steel, electric field coupled with the drive coil to drive the lens holder to move in the direction along the optical axis; an image stabilization coil, electric field coupled with the drive magnetic steel to drive the lens holder to move in the direction perpendicular to the optical axis.

19 Claims, 8 Drawing Sheets

LENS DRIVE DEVICE

TECHNICAL FIELD

The present disclosure relates to a drive device, in particular to a lens drive device.

BACKGROUND

With the development of imaging technology, a lens drive device is widely applied to various imaging devices. Combinations of the lens drive device and various portable electronic devices, such as a mobile phone, a camera, a computer, is more favored by consumers.

The lens drive device in the conventional art includes a base, a support frame, a lens holder for mounting a lens, a pair of upper elastic sheets connecting the support frame and the lens holder to suspend the lens holder in the support frame, a suspension wire connecting the support frame and the base to suspend the support frame above the base and electrically connected to the pair of upper elastic sheets, a drive coil fixed on the outside of the lens holder, a drive magnetic steel fixed on the support frame and electric field coupled with the drive coil to drive the lens holder to move along an optical axis, and an image stabilization coil electric field coupled with the drive magnetic steel to drive the lens holder to move in a direction perpendicular to the optical axis, where the base is provided with a conductive terminal electrically connected to the suspension wire. However, this kind of lens drive device only relies on the support function of the suspension wire, which not only causes the suspension wire to be easily fatigued, but also has poor anti-drop performance of the lens drive device, thereby affecting the reliability of the lens drive device.

Therefore, it is necessary to provide a new lens drive device to solve the above problems.

SUMMARY

An objective of the present disclosure is to provide a lens drive device, which can not only effectively reduce the fatigue of suspension wire, but also improve the poor anti-drop performance of the lens drive device, thereby improving the reliability of the lens drive device.

In order to achieve the above objective, a lens drive device is provided according to the present disclosure, and the lens drive device includes:

a base;

a support frame, suspended on the base;

a lens holder, suspended in the support frame and configured to mount a lens; a pair of upper elastic sheets, which are insulated from each other, each of the pair of upper elastic sheets includes a first upper arm fixed on a side of the lens holder away from the base, a second upper arm fixed on a side of the support frame away from the base, and an upper elastic arm connecting the first upper arm to the second upper arm;

a conductive support piece, where the conductive support piece is arranged at two opposite ends of each of the pair of upper elastic sheets, the conductive support piece includes an elastic piece and a suspension wire, the elastic piece includes a holding portion fixed on a side of the second upper arm away from the support frame and electrically connected to the second upper arm, a fixing portion spaced from the support frame in a direction perpendicular to an optical axis, and an elastic portion that connects the holding portion to the fixing portion and can be elastically deformed in a direction along the optical axis and the direction perpendicular to the optical axis; the suspension wire connects the fixing portion to the base;

a drive coil, fixed on an outer side of the lens holder and electrically connected to a pair of the first upper arms, respectively;

a drive magnetic steel, fixed on the support frame and electric field coupled with the drive coil to drive the lens holder to move in the direction along the optical axis;

an image stabilization coil, electric field coupled with the drive magnetic steel to drive the lens holder to move in the direction perpendicular to the optical axis.

As an improvement, the second upper arm includes two fixing arms that are spaced from each other, and the two fixing arms are fixed with the holding portion of the elastic piece, respectively, the two fixing arms are a first fixing arm and a second fixing arm, respectively, and the first fixing arm is electrically connected to the holding portion.

As an improvement, the support frame is arranged with a hot riveting stud passing through the fixing arm and the holding portion in the direction along the optical axis, and the fixing arm is fixed with the support frame and the holding portion by the hot riveting stud; a contact surface between the first fixing arm and the holding portion is insulated, the support frame is further injection-molded with a conductive terminal, and the first fixing arm is electrically connected to the holding portion by the conductive terminal.

As an improvement, the conductive terminal includes a first conductive portion and a second conductive portion that are exposed from the support frame, and a third conductive portion embedded in the support frame and connecting the first conductive portion to the second conductive portion; the first fixing arm is welded to the first conductive portion, and the holding portion is welded to the second conductive portion.

As an improvement, a side of the support frame away from the base is recessed to form an accommodating portion for accommodating the fixing arm and the holding portion, and the accommodating portion is located at a chamfer of the support frame.

As an improvement, a protruding portion is formed on an outer wall of the support frame corresponding to the suspension wire, the protruding portion has a position-limiting groove facing toward the suspension wire, a wall surface of the position-limiting groove is spaced from the suspension wire, and the wall surface of the position-limiting groove intersects with the optical axis.

As an improvement, damping glue is applied on the wall surface of the position-limiting groove, a surface of the damping glue on the position-limiting groove is spaced from the suspension wire, and the surface of the damping glue on the position-limiting groove intersects with the optical axis.

As an improvement, the image stabilization coil is fixed on the base, a projection of the drive magnetic steel along the optical axis at least partially overlaps with the image stabilization coil, and a displacement sensor corresponding to the image stabilization coil is fixed on the base.

As an improvement, a conductive circuit and a conductive welding pad are arranged on the base, the image stabilization coil and the displacement sensor are electrically connected to the conductive circuit, respectively, and the suspension wire is connected to the conductive welding pad.

As an improvement, there are four conductive support pieces, and the four conductive support pieces are symmetrically arranged with respect to a center of the optical axis.

Compared with the conventional art, in the lens drive device of the present disclosure, the conductive support piece is arranged at two opposite ends of each of the pair of upper elastic sheets, and the conductive support piece is arranged to include the elastic piece and the suspension wire. The drive coil, the upper elastic sheet, the elastic piece, and the suspension wire together form a current loop. Moreover, the elastic piece includes the holding portion fixed on a side of the second upper arm away from the support frame and electrically connected to the second upper arm, the fixing portion spaced from the support frame in a direction perpendicular to the optical axis, and the elastic portion that connects the holding portion to the fixing portion and can be elastically deformed in the direction along the optical axis and the direction perpendicular to the optical axis. The suspension wire connects the fixing portion to the base. In this way, the lens drive device can buffer the deformation of the suspension wire by the elastic deformation of the elastic portion in a process of anti-dropping and optical anti-shaking, so that the fatigue of the suspension wire can be effectively reduced and the poor anti-drop performance of the lens drive device can be improved to improve the reliability of the lens drive device.

BRIEF DESCRIPTION OF THE DRAWINGS

For more clearly illustrating technical solutions in the embodiments of the present disclosure, drawings for describing the embodiments will be briefly described hereinafter. Apparently, drawings in the following description are only part of the embodiments of the present disclosure, and for the person skilled in the art, other drawings may be obtained based on the set drawings without any creative efforts.

DETAILED DESCRIPTION

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments of the present disclosure, all other embodiments obtained without creative efforts by those of ordinary skill in the art shall fall within the protection scope of the present disclosure.

Figure 1:
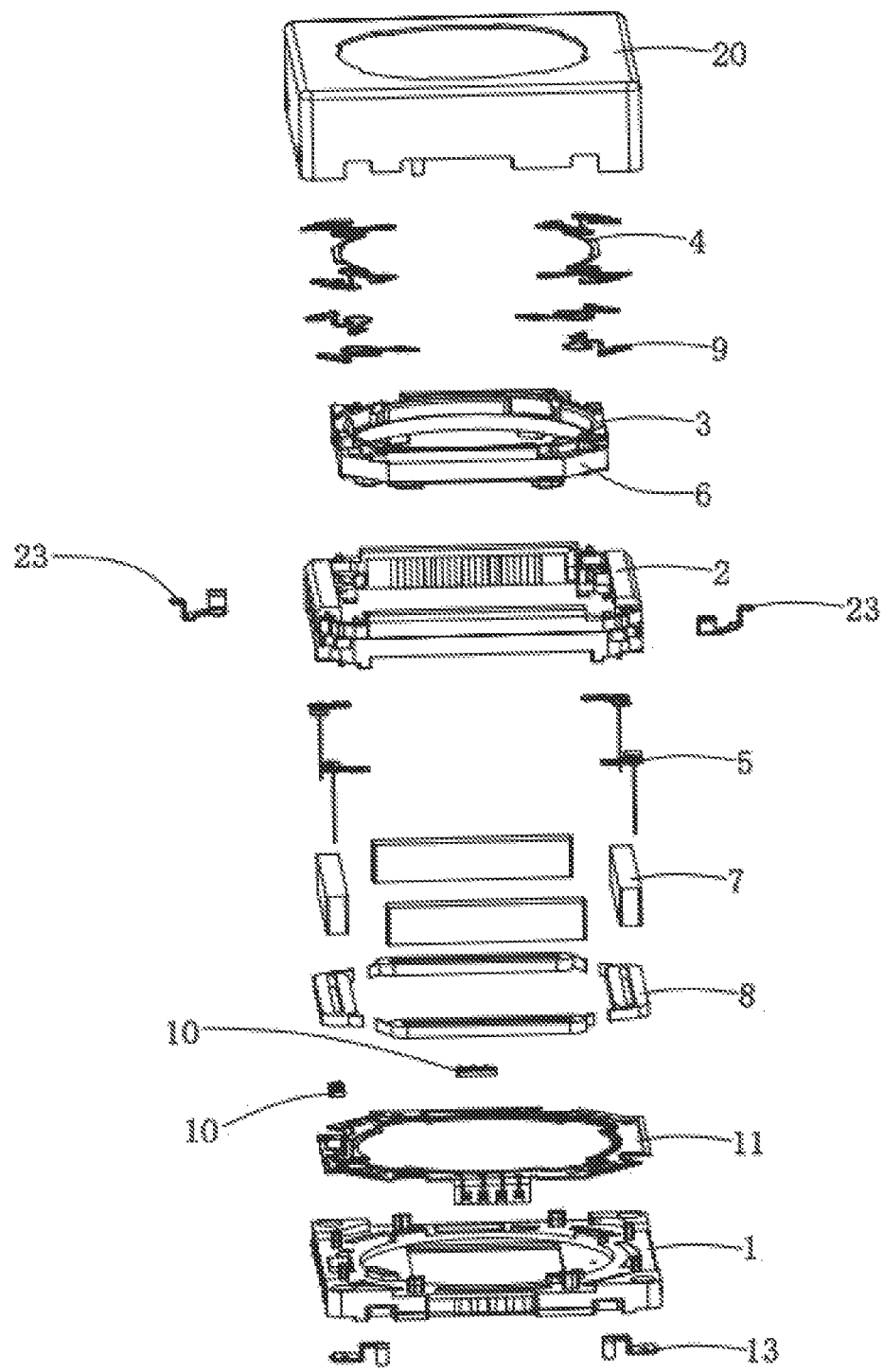
FIG. 1 is an explosive view of a lens drive device provided according to the present disclosure.
Figure 2:
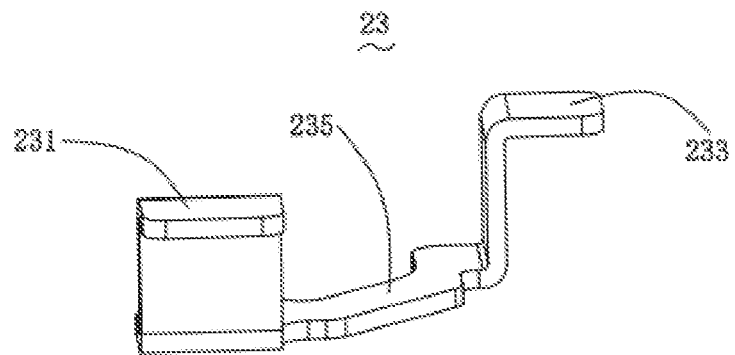
FIG. 2 is a schematic structural view of a conductive terminal in the lens drive device shown in FIG. 1.
Figure 3:
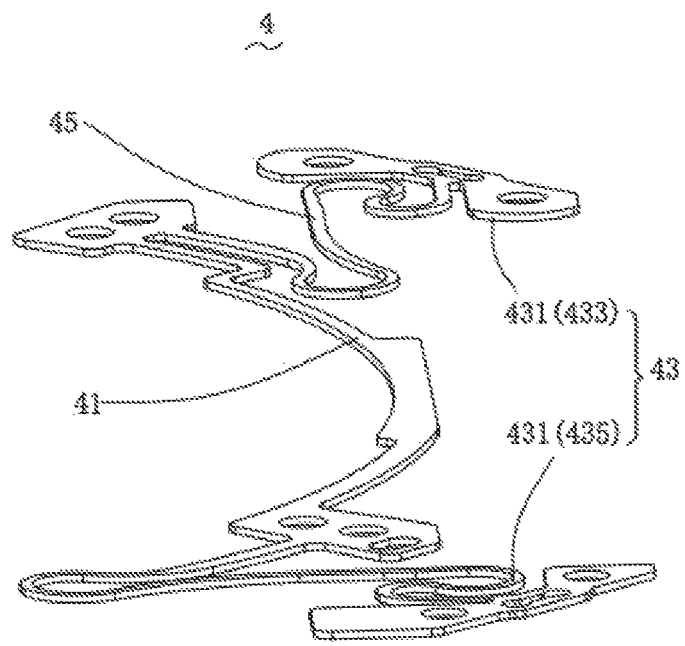
FIG. 3 is a schematic structural view of a pair of upper elastic sheets in the lens drive device shown in FIG. 1.
Figure 4:
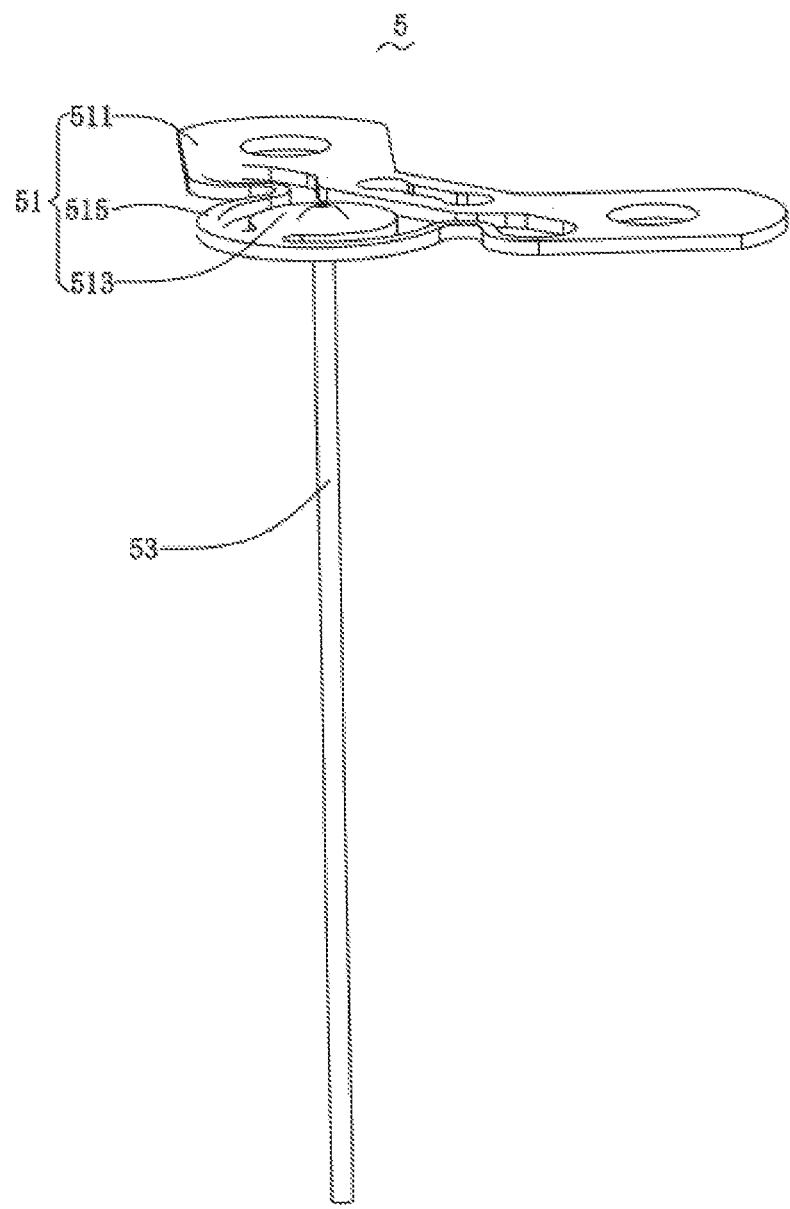
FIG. 4 is a schematic structural view of a conductive support piece in the lens drive device shown in FIG. 1.
Figure 5:
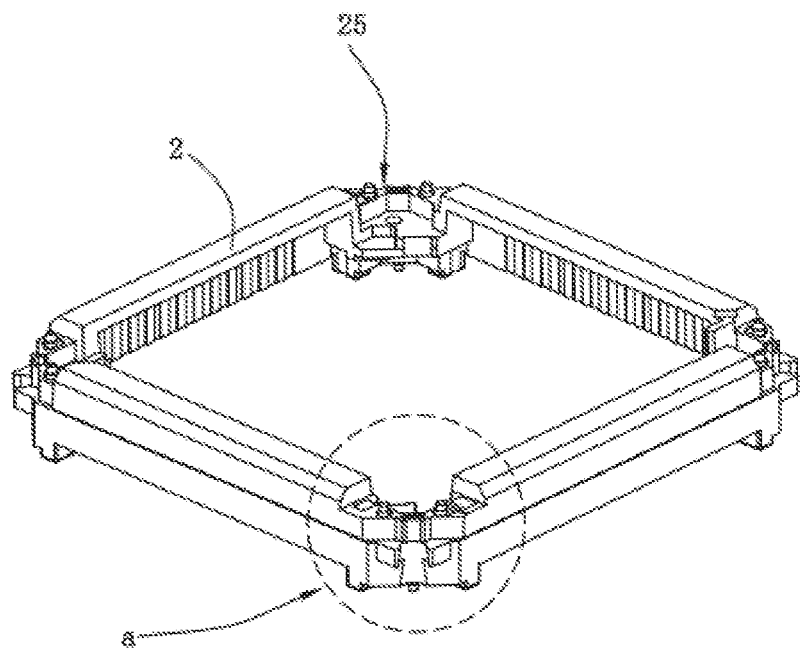
FIG. 5 is a schematic structural view after the conductive terminal is injection-molded on the support frame in the lens drive device shown in FIG. 1.
Figure 6:
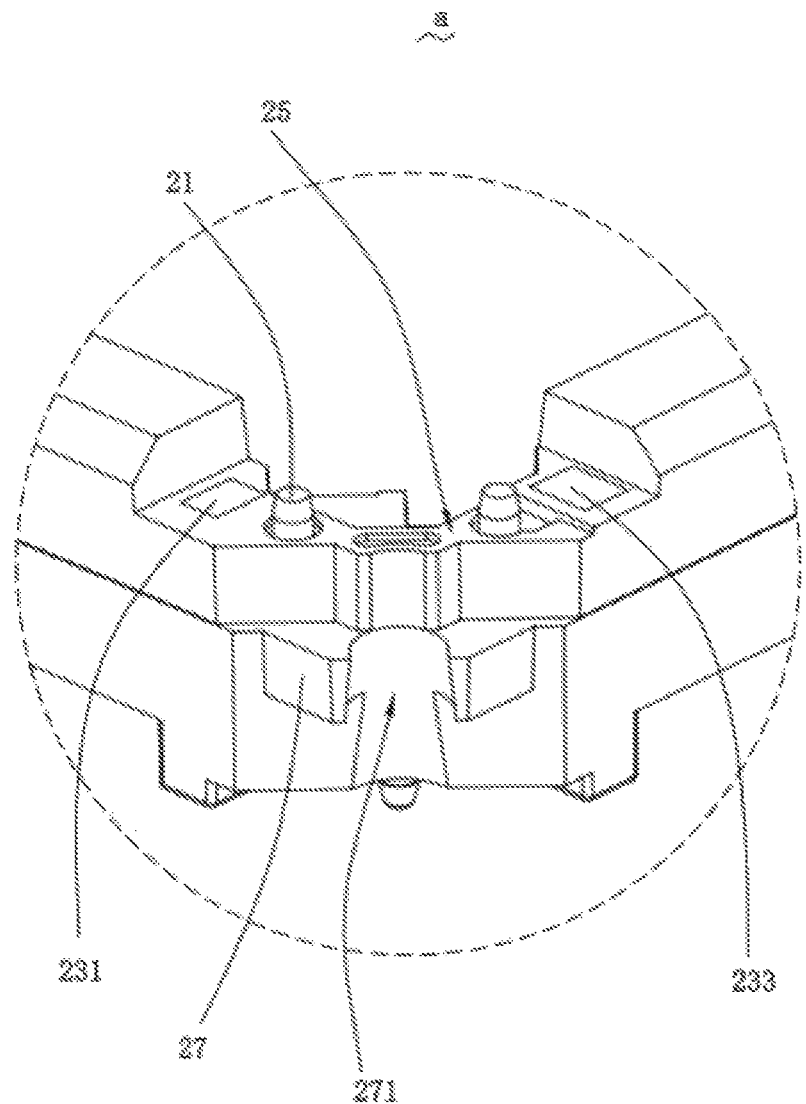
FIG. 6 is an enlarged view of part a in a structure shown in FIG. 5.
Figure 7:
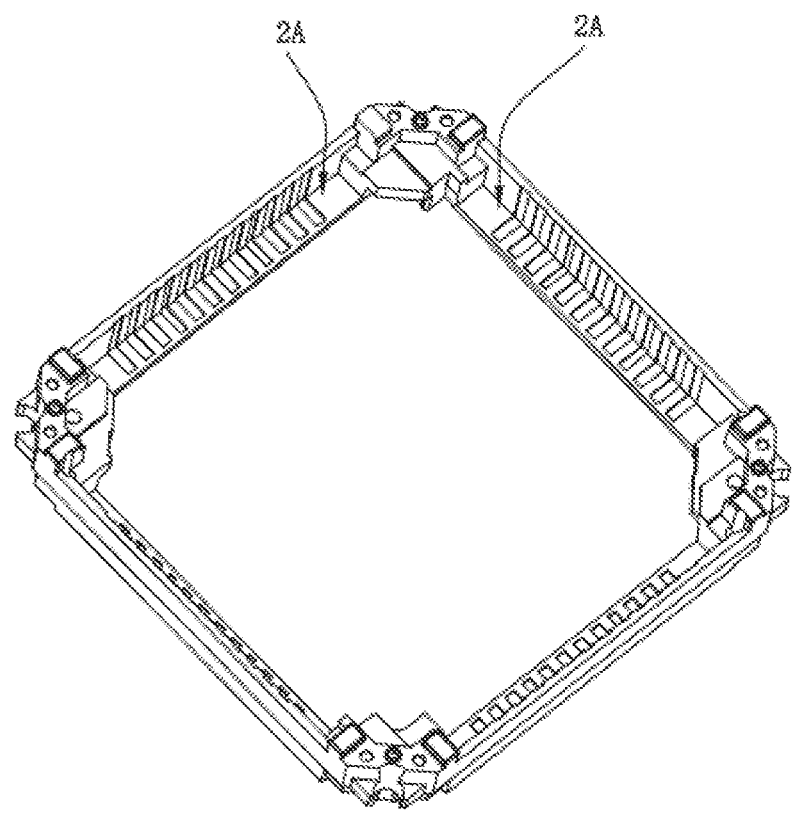
FIG. 7 is the structural schematic view of the structure shown in FIG. 5 from another perspective.
Figure 8:
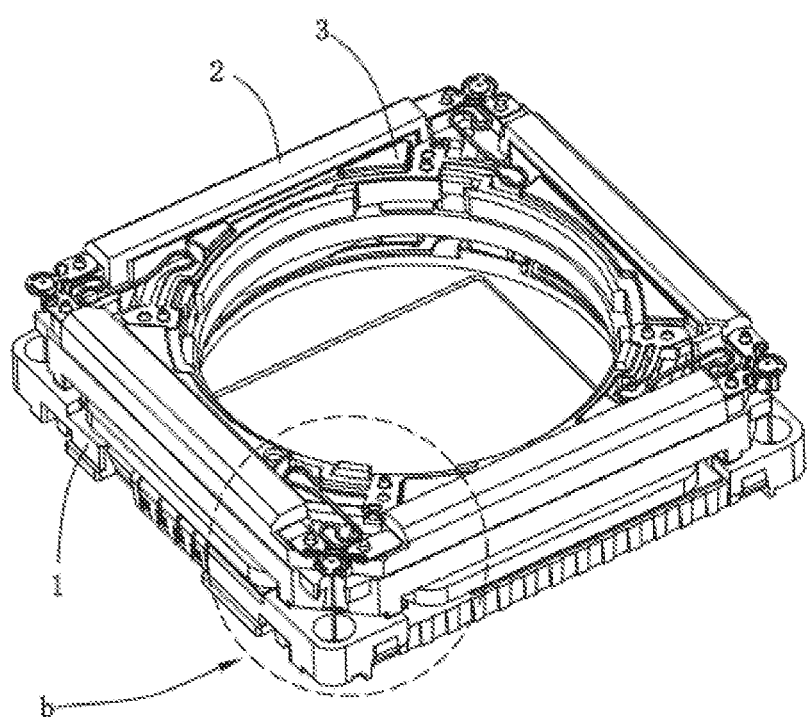
FIG. 8 is a schematic structural view of a partially assembled structure of the lens drive device shown in FIG. 1.
Figure 9:
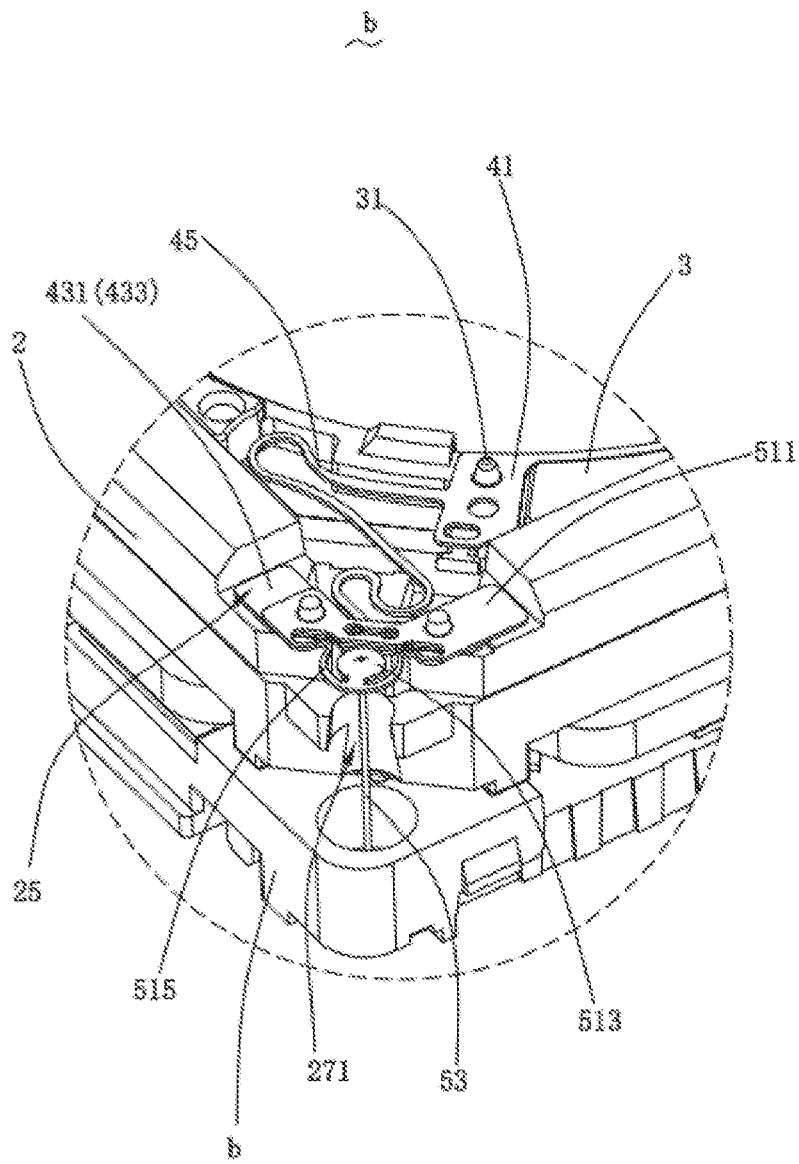
FIG. 9 is an enlarged view of part b in the partially assembled structure shown in FIG. 8.

As shown in FIG. 1 and FIG. 9, the lens drive device provided by the present disclosure includes a base 1, a support frame 2, a lens holder 3, a pair of upper elastic sheets 4, a conductive support piece 5, a drive coil 6, a drive magnetic steel 7, and an image stabilization coil 8.

The support frame 2 is suspended on the base 1.

The lens holder 3 is suspended in the support frame 2 and is configured to mount a lens (not shown). The lens includes a lens barrel fixed on the lens holder and a lens group fixed in the lens barrel.

A pair of the upper elastic sheets 4 are mutually insulated, and the pair of upper elastic sheets 4 are spring plate structures have deformation direction along the optical axis.

Each of the pair of upper elastic sheet 4 includes a first upper arm 41 fixed on a side of the lens holder 3 away from the base 1, a second upper arm 42 fixed on a side of the support frame 2 away from the base 1, and an upper elastic arm 45 connecting the first upper arm 41 to the second upper arm 43. That is, the lens holder 3 is suspended in the support frame 2 by the pair of upper elastic sheets 4, so that the lens holder 3 and the lens mounted on the lens holder 3 can move up and down in the direction along the optical axis.

The conductive support pieces 5 is arranged at both two opposite ends of each of the pair of upper elastic sheets 4. That is, there are four of the conductive support pieces 5, and the four conductive support pieces 5 are arranged symmetrically with respect to the center of the optical axis.

Each of the conductive support pieces 5 includes an elastic piece 51 and a suspension wire 53. The elastic piece 51 is perpendicular to the spring plate structure.

The elastic piece 51 includes a holding portion 511 fixed on a side of the second upper arm 43 away from the support frame 2 and electrically connected to the second upper arm 43, a fixing portion 513 spaced from the support frame 2 in a direction perpendicular to an optical axis, and an elastic portion 515 that connects the holding portion 511 to the fixing portion 513 and can be elastically deformed in a direction along the optical axis and the direction perpendicular to the optical axis. The suspension wire 53 connects the fixing portion 513 to the base 1. That is to say, the support frame 2 is suspended on the base 1 by the conductive support pieces 5, so that the support frame 2, the lens holder 3 and the lens mounted on the lens holder 3 can move up and down in a direction perpendicular to the optical axis.

It should be noted that the connection between the suspension wire 53 and the fixing portion 513 includes both a fixing connection and an electrical connection. Specifically, the suspension wire 53 may be connected to the fixing portion 513 by tinning welding.

The drive coil 6 is fixed on an outer side of the lens holder 3 and is electrically connected to the pair of the first upper arms 41, respectively. The drive coil 6, the upper elastic sheet 4, the elastic piece 51 and the suspension wire 53 form a current loop.

The drive magnetic steel 7 is fixed on the supporting frame 2 and is electric field coupled with the drive coil 6 to drive the lens holder 3 to move in the direction along the optical axis, thereby realizing the automatic focusing (AF) function of the lens drive device.

As shown in FIG. 1, four drive magnetic steels 7 are provided, and the four drive magnetic steels 7 are arranged around the drive coil 6 and are symmetrically arranged about the center of the optical axis to form a uniform magnetic field. The magnetization direction of each of the drive magnetic steels 7 is perpendicular to the optical axis.

In this embodiment, the support frame 2 is formed with four accommodating grooves 2A, and the four drive magnetic steels 7 are fixed in the four accommodating grooves 2A in a one-to-one correspondence.

The image stabilization coil 8 is electric field coupled with the drive magnetic steels 7 to drive the lens holder 3 to move in the direction perpendicular to the optical axis, so as to realize the optical image stabilization (OIS) function of the lens drive device. In response to energizing the image stabilization coil 8, the drive magnetic steels 7 fixed on the support frame 2 is driven to move in the direction perpendicular to the optical axis, so as to drive the lens holder 3 to move in the direction perpendicular to the optical axis.

In this embodiment, the second upper arm 43 includes two fixing arms 431 spaced from each other, and the two fixing arms 431 are fixed with the holding portion 511 of the elastic piece 51, respectively. The two fixing arms 431 are respectively a first fixing arm 433 and a second fixing arm 435, and the first fixing arm 433 is electrically connected to the holding portion 511.

In this embodiment, the support frame 2 is arranged with a hot riveting stud 21 passing through the fixing arm 431 and the holding portion 511 in the direction along the optical axis, and the fixing arm 431 is fixed with the support frame 2 and the holding portion 511 by the hot riveting stud 21. A contact surface between the first fixing arm 433 and the holding portion 511 is insulated, the support frame 2 is further injection-molded with a conductive terminal 23, and the first fixing arm 433 is electrically connected to the holding portion 511 by the conductive terminal 23.

The conductive terminal 23 includes a first conductive portion 231 and a second conductive portion 233 that are exposed from the support frame 2, and a third conductive portion 235 embedded in the support frame 2 and connecting the first conductive portion 231 to the second conductive portion 233. The first fixing arm 433 is welded to the first conductive portion 231, and the holding portion 511 is welded to the second conductive portion 233, so that the first fixing arm 433 is electrically connected to the holding portion 511 by the conductive terminal 23.

In this embodiment, a side of the support frame 2 away from the base 1 is recessed to form an accommodating portion 25 for accommodating the fixing arm 431 and the holding portion 511, and the accommodating portion 25 is located at a chamfer of the support frame 2.

In this embodiment, a protruding portion 27 is formed on an outer wall of the support frame 2 corresponding to the suspension wire 53, and the protruding portion 27 has a position-limiting groove 271 facing toward the suspension wire 53. A wall surface of the position-limiting groove 271 is spaced from the suspension wire 53, and the wall surface of the position-limiting groove 271 intersects with the optical axis.

Further, in order to prevent the suspension wire 53 from rigidly colliding with the wall surface of the position-limiting groove 271 when the support frame 2 moves in the direction perpendicular to the optical axis, damping glue is applied on the wall surface of the position-limiting groove 271, a surface of the damping glue on the position-limiting groove 271 is spaced from the suspension wire 53, and the surface of the damping glue on the position-limiting groove 271 intersects with the optical axis.

In this embodiment, the lens holder 3 is provided with a hot riveting column 31 passing through the first upper arm 41, and the lens holder 3 and the first upper arm 41 are fixed by the hot riveting column 31.

In this embodiment, the image stabilization coil 8 is fixed on the base 1, a projection of the drive magnetic steel 7 along the optical axis at least partially overlaps with the image stabilization coil 8, and a displacement sensor 10 corresponding to the image stabilization coil 8 is fixed on the base 1. There are four image stabilization coils 8, and the four image stabilization coils 8 are arranged in a one-to-one correspondence with the four drive magnetic steels 7. The image stabilization coils 8 are coils wound by wires, and the winding direction of the image stabilization coils 8 is parallel to the optical axis. The displacement sensor 10 is configured to detect the displacement of the support frame 2 in the direction perpendicular to the optical axis.

A conductive circuit 11 and a conductive welding pad 13 are arranged on the base 1, the image stabilization coil 8 and the displacement sensor 10 are electrically connected to the conductive circuit 11, respectively. The suspension wire 53 is connected to the conductive welding pad 13.

As shown in FIG. 1, the conductive circuit 11 is a circuit board arranged on the base 1, and the conductive welding pad 13 is a conductive terminal injection-molded on the base 1. It should be noted that, in other embodiments, the conductive circuit 11 and the conductive welding pad 13 may also formed on the base 1 by laser engraving.

In this embodiment, the lens drive device further includes two pairs of lower elastic sheets 9, the lens holder 3 is also suspended in the support frame 2 by the lower elastic sheets 9, and the lower elastic sheets 9 are spring plate structures has a deformation direction along the optical axis plate. Specifically, one end of each of the lower elastic sheet 9 is fixed on a side of the lens holder 3 facing toward the base 1, and the other end of each of the lower elastic sheet 9 is fixed on a side of the support frame 2 facing toward the base 1.

In this embodiment, the lens drive device further includes a casing 20 covering the support frame 2 and fixedly supported by the base 1. The casing 20 forms protection for the internal components of the lens drive device.

Compared with the conventional art, in the lens drive device of the present disclosure, the conductive support piece is arranged at two opposite ends of each of the pair of upper elastic sheets, and the conductive support piece is arranged to include the elastic piece and the suspension wire. The drive coil, the upper elastic sheet, the elastic piece, and the suspension wire together form a current loop. Moreover, the elastic piece includes the holding portion fixed on a side of the second upper arm away from the support frame and electrically connected to the second upper arm, the fixing portion spaced from the support frame in a direction perpendicular to the optical axis, and the elastic portion that connects the holding portion to the fixing portion and can be elastically deformed in the direction along the optical axis and the direction perpendicular to the optical axis. The suspension wire connects the fixing portion to the base. In this way, the lens drive device can buffer the deformation of the suspension wire by the elastic deformation of the elastic portion in a process of anti-dropping and optical anti-shaking, so that the fatigue of the suspension wire can be effectively reduced and the poor anti-drop performance of the lens drive device can be improved to improve the reliability of the lens drive device.

The above are only the embodiments of the present disclosure. It should be pointed out that for those of ordinary skill in the art, improvements may be made without departing from the inventive concept of the present disclosure, and these improvements shall fall within the protection scope of the present disclosure.

The invention claimed is:
1. A lens drive device, comprising:
a base;

a support frame, suspended on the base;

a lens holder, suspended in the support frame and configured to mount a lens;

a pair of upper elastic sheets, mutually insulated from each other, wherein each of the pair of upper elastic sheets comprises a first upper arm fixed on a side of the lens holder away from the base, a second upper arm fixed on a side of the support frame away from the base, and an upper elastic arm connecting the first upper arm to the second upper arm;

a conductive support piece, wherein the conductive support piece is arranged at two opposite ends of each of the pair of upper elastic sheets, the conductive support piece comprises an elastic piece and a suspension wire, the elastic piece comprises a holding portion fixed on a side of the second upper arm away from the support frame and electrically connected to the second upper arm, a fixing portion spaced from the support frame in a direction perpendicular to an optical axis, and an elastic portion that connects the holding portion to the fixing portion and can be elastically deformed in a direction along the optical axis and the direction perpendicular to the optical axis; the suspension wire connects the fixing portion to the base;

a drive coil, fixed on an outer side of the lens holder and electrically connected to a pair of the first upper arms, respectively;

a drive magnetic steel, fixed on the support frame and electric field coupled with the drive coil to drive the lens holder to move in the direction along the optical axis;

an image stabilization coil, electric field coupled with the drive magnetic steel to drive the lens holder to move in the direction perpendicular to the optical axis.

2. The lens drive device according to claim 1, wherein the second upper arm comprises two fixing arms that are spaced from each other, and the two fixing arms are fixed with the holding portion of the elastic piece, respectively, the two fixing arms are a first fixing arm and a second fixing arm, respectively, and the first fixing arm is electrically connected to the holding portion.

3. The lens drive device according to claim 2, wherein the support frame is arranged with a hot riveting stud passing through the fixing arm and the holding portion in the direction along the optical axis, and the fixing arm is fixed with the support frame and the holding portion by the hot riveting stud; a contact surface between the first fixing arm and the holding portion is insulated, the support frame is further injection-molded with a conductive terminal, and the first fixing arm is electrically connected to the holding portion by the conductive terminal.

4. The lens drive device according to claim 3, wherein the conductive terminal comprises a first conductive portion and a second conductive portion that are exposed from the support frame, and a third conductive portion embedded in the support frame and connecting the first conductive portion to the second conductive portion; the first fixing arm is welded to the first conductive portion, and the holding portion is welded to the second conductive portion.

5. The lens drive device according to claim 2, wherein a side of the support frame away from the base is recessed to form an accommodating portion for accommodating the fixing arm and the holding portion, and the accommodating portion is located at a chamfer of the support frame.

6. The lens drive device according to claim 3, wherein a side of the support frame away from the base is recessed to form an accommodating portion for accommodating the fixing arm and the holding portion, and the accommodating portion is located at a chamfer of the support frame.

7. The lens drive device according to claim 4, wherein a side of the support frame away from the base is recessed to form an accommodating portion for accommodating the fixing arm and the holding portion, and the accommodating portion is located at a chamfer of the support frame.

8. The lens drive device according to claim 1, wherein a protruding portion is formed on an outer wall of the support frame corresponding to the suspension wire, the protruding portion has a position-limiting groove facing toward the suspension wire, a wall surface of the position-limiting groove is spaced from the suspension wire, and the wall surface of the position-limiting groove intersects with the optical axis.

9. The lens drive device according to claim 8, wherein damping glue is applied on the wall surface of the position-limiting groove, a surface of the damping glue on the position-limiting groove is spaced from the suspension wire, and the surface of the damping glue on the position-limiting groove intersects with the optical axis.

10. The lens drive device according to claim 9, wherein the lens holder is provided with a hot riveting column passing through the first upper arm, and the lens holder and the first upper arm are fixed by the hot riveting column.

11. The lens drive device according to claim 1, wherein the image stabilization coil is fixed on the base, a projection of the drive magnetic steel along the optical axis at least partially overlaps with the image stabilization coil, and a displacement sensor corresponding to the image stabilization coil is fixed on the base.

12. The lens drive device according to claim 11, wherein a conductive circuit and a conductive welding pad are arranged on the base, the image stabilization coil and the displacement sensor are electrically connected to the conductive circuit, respectively, and the suspension wire is connected to the conductive welding pad.

13. The lens drive device according to claim 12, wherein the displacement sensor is configured to detect a displacement of the support frame in the direction perpendicular to the optical axis.

14. The lens drive device according to claim 1, wherein there are four of the conductive support pieces, and the four conductive support pieces are symmetrically arranged with respect to a center of the optical axis.

15. The lens drive device according to claim 14, wherein there are four of the drive magnetic steels, and the four drive magnetic steels are arranged around the drive coil and are symmetrically arranged about the center of the optical axis to form a uniform magnetic field, and a magnetization direction of each of the four drive magnetic steels is perpendicular to the optical axis.

16. The lens drive device according to claim 15, wherein there are four of the image stabilization coils arranged in a one-to-one correspondence to the four drive magnetic steels.

17. The lens drive device according to claim 16, wherein each of the four image stabilization coils is a coil wound by wires, and a winding direction of each of the four image stabilization coils is parallel to the optical axis.

18. The lens drive device according to claim 1, further comprising a casing covering the support frame and fixedly supported by the base, and the casing is configured to protect internal components of the lens drive device.

19. The lens drive device according to claim 18, further comprising two pairs of lower elastic sheets, the lens holder is suspended in the support frame by the two pairs of lower elastic sheets, and the two pairs of lower elastic sheets are spring plate structures, each of the two pairs of lower elastic sheets has a deformation direction along the optical axis.

* * * * *